(No Model.)
H. E. STURCKE.
PROCESS OF PREPARING AMORPHOUS CARBONATE OF LIME FROM RESIDUES.
No. 603,225. Patented Apr. 26, 1898.
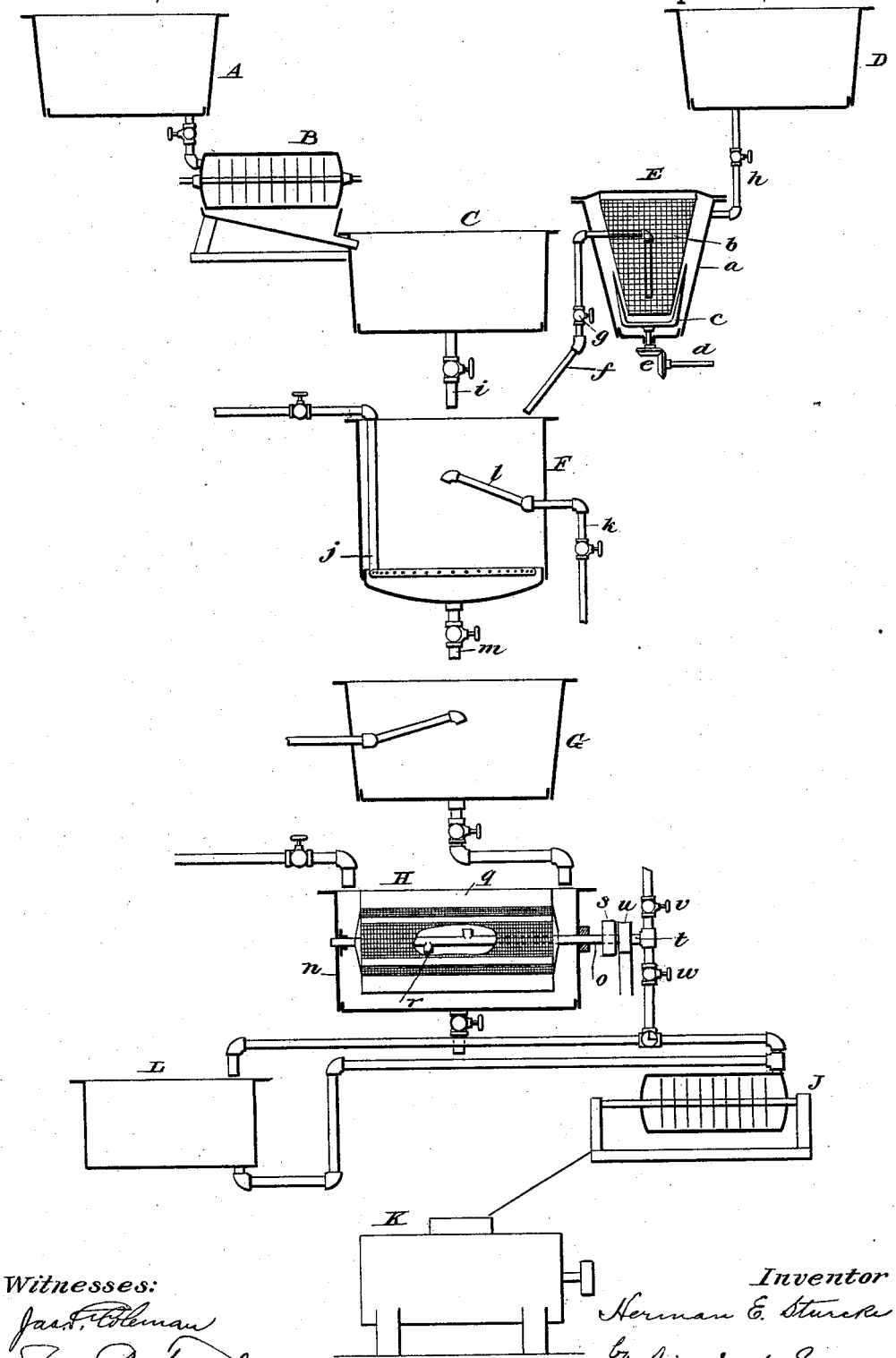
Witnesses:
Inventor
Herman E. Sturcke
by Rich'd N. Dyer
Att'y

UNITED STATES PATENT OFFICE.

HERMAN E. STURCKE, OF JAMAICA, NEW YORK, ASSIGNOR TO THE ÆTNA CHEMICAL COMPANY, OF NEW YORK, N. Y.

PROCESS OF PREPARING AMORPHOUS CARBONATE OF LIME FROM RESIDUES.

SPECIFICATION forming part of Letters Patent No. 603,225, dated April 26, 1898.

Application filed December 16, 1897. Serial No. 662,165. (No specimens.)

*To all whom it may concern:*

Be it known that I, HERMAN E. STURCKE, a citizen of the United States, residing at Jamaica, in the county of Queens and State of New York, have invented a certain new and useful Improvement in Processes of Preparing Amorphous Carbonate of Lime, of which the following is a specification.

My invention relates to an improved process of obtaining an amorphous carbonate of lime of extremely fine division which will be equal in many respects to the so-called "precipitated chalk" or calcium carbonate now obtained by precipitating a solution of a soluble calcium salt, such as chlorid of calcium, with a solution of a soluble alkali carbonate, such as carbonate of soda.

While the amorphous carbonate of lime obtained by my improved process is in many respects equal to precipitated chalk, it is produced at a very much decreased cost.

Broadly stated, the invention consists in treating calcium oxid, whether the same is employed as quicklime or in the hydrated form as slaked lime, with a solution of an alkali carbonate under such conditions as will result in obtaining calcium carbonate or carbonate of lime in a finely-divided amorphous form and to remove at the same time all impurities, so that the resulting product will be practically pure.

I am aware that it is not new in the manufacture of carbonate of lime to treat calcium oxid with a solution of alkali carbonate, as such process is constantly used in the manufacture of caustic soda and caustic potash by treating their respective carbonates with caustic lime. I claim as new and original, however, the process to be described and by which will be produced, in addition to an acceptable caustic alkali, a pure calcium carbonate of commercial value in finely-divided amorphous form in the place of the impure, unclean, and useless calcium carbonate which at the present time constitutes a valueless waste product in the processes as now carried out in the manufacture of caustic soda and caustic potash. At the present time not only is the calcium carbonate obtained in such processes a valueless waste product, but as it accumulates in large quantities it constitutes a nuisance and is a source of expense to the manufacturers.

To obtain the object of my invention, I remove as far as possible or desirable all impurities from the raw materials—namely, the quicklime and the alkali carbonate. I then bring the purified raw materials together and allow them to act upon each other under proper conditions. I then separate the products, the solution of caustic lime and calcium carbonate, and remove from the latter product all impurities which may still accompany the same. In order to purify the alkali carbonate, I preferably use the same in the form of a clarified filtered solution. Frequently when very pure alkali carbonate is employed it is not necessary to clarify and filter the solution thereof; but when inferior grades of alkali carbonate are used, and especially carbonates forming a waste or recovered product—as, for instance, the black-ash liquor of soda-fiber (paper-pulp) factories—I clarify the alkali-carbonate solution by careful filtration, with or without the previous addition of such clarifying materials as clay or alum solutions or calcium salts solutions, &c. The caustic lime is preferably purified by reducing the same to a thin milk of lime, in which condition the lime is reduced to extremely fine particles, which by screening, floating, or jigging can readily be separated from all accidental impurities, thus obtaining the caustic lime in a purified condition. Instead of screening the caustic lime in form of milk of lime the lime can also be purified by slaking the lime with sufficient water only to reduce it to a fine dry powder. This powder is then screened and bolted to remove foreign coarser particles; or the lime, as quicklime, may be mechanically powdered, screened, and bolted. While the mechanical purification of the lime in form of a thin milk of lime is preferable as more economical, the other methods can be employed. The purified materials are allowed to react upon each other in the presence of water, preferably at an increased temperature. If the alkali carbonate and the lime are relatively pure, they may be mixed by throwing the alkali carbonate into water and by then slaking the quicklime in this alkali-carbonate solution, or the alkali carbonate may be dissolved in the thin milk of lime obtained by slaking the quicklime in an excess of water. In whatever manner the mixture may be made I prefer that it shall consist of one hundred to one hundred and twenty parts of water, ten parts of carbonate of potash, and four to five parts of caustic lime, or of eighty to one hundred parts of water, ten parts of carbonate of soda, and six to seven parts of caustic lime. While these proportions may be greatly varied without materially changing the results, I prefer to follow the same as resulting in a quick and fairly complete reaction when the temperature of the mixture is raised by steam or otherwise. The reaction results in a solution of caustic soda or caustic potash, with a small amount of caustic lime in solution, and an insoluble sediment of calcium carbonate or carbonate of lime containing an excess of caustic hydrated lime and other impurities. The solution is separated from the calcium carbonate by decantation or filtration. The calcium carbonate is washed to remove as far as practicable the caustic alkali. The remaining calcium carbonate may still contain an excess of caustic lime and soluble and insoluble impurities which must be removed. The caustic lime and soluble impurities may be removed by washing with an excess of water, or the caustic lime may be converted into carbonate of lime by an additional treatment with a new quantity of alkali carbonate or by treating with carbonic acid in aqueous solution or in gas form, or it may be converted into a more or less soluble solution of lime salt by treatment with a suitable acid, such as muriatic acid, sulfurous acid, or sulfuric acid. Whatever the treatment may be to convert or remove the caustic lime contained in the lime carbonate the treatment is preferably applied to the lime carbonate suspended in an excess of water. This thin milk of carbonate of lime, which consists of extremely fine amorphous particles of carbonate of lime, of soluble impurities, and of insoluble impurities, is separated from the insoluble impurities by screening, floating, or jigging and from the soluble impurities by filtration and lixiviation. The previous screening, floating, or jigging of the caustic milk of lime will frequently make it unnecessary to apply a corresponding operation to the milk of carbonate of lime. The remaining pure carbonate of lime of amorphous finely-divided form may be suitably dried and used in place of precipitated chalk or in place of whiting, or it may be utilized in paste or fluid form to form the basis of other pure lime salts, such as sulfate of lime and others, by treating the milk of carbonate of lime with a suitable acid.

In order that my improved process may be understood, I illustrate in the accompanying drawing a suitable apparatus in which it may be carried out.

A represents a tank in which a solution of alkali carbonate is contained. Connected with this tank is a filter-press B or other filtering device by means of which the solution will be clarified. C is a tank for receiving from said filter-press the filtered solution.

D represents a tank or other storage device for containing the thin milk of caustic or crude lime, and which, if the same is not sufficiently pure, is passed through a separating device E, by means of which the very fine lime particles are separated from the heavier and coarser impurities. The particular form of separating device shown comprises a receiving tank or vessel $a$, having a very fine screen $b$ therein, depending from the cover or top downward in the form of a truncated cone. Working on the outside of this screen are a plurality of stirring-arms $c$, driven from a shaft $d$ through the beveled gears $e$. Extending from a point within the screen $b$ is a siphon $f$, provided with a valve $g$ therein. Instead of said siphon a suction-pipe may be employed. The tank D connects with the interior of the vessel E, outside of the screen $b$, by a valved pipe $h$. The siphon $f$ and a valved exit-pipe $i$ from the tank C lead to a reaction-tank F. This tank is preferably provided with a steam-coil $j$, by which the contents of the reaction-tank can be heated to the desired temperature. In order to draw off the clear caustic-alkali solution, I employ a draw-off pipe $k$, having a pivoted inner end $l$, by means of which the liquid may be drawn off at different levels, as will be understood. The calcium-carbonate precipitate formed by the reaction in the tank F is removed through a valved pipe $m$ and passes into a mixing-tank G, in which tank the carbonate of lime from the reaction-tank F is mixed with a sufficient amount of water to form a very thin milk of carbonate of lime. Either in tank G or in the screening apparatus H the milk of lime may be treated with a small amount of carbonic acid or muriatic acid, sulfurous acid, or sulfuric acid to convert the possibly present caustic lime into carbonate or to make the caustic lime and other impurities more soluble. Instead of applying this treatment to the carbonate of lime before another possible screening operation it may be applied after the screening, before or during the separation of the carbonate of lime from the water which carries it in suspension. From the tank G the milk of carbonate may, if desired, pass to a second separating apparatus, by which the very finely divided amorphous carbonate may be mechanically separated from any impurities which may still be contained therewith. This mechanical separation may be effected by screening, floating, or jigging; but it is preferably effected by a screening operation, owing to the economy and effectiveness of such character of separation.

The screening apparatus illustrated is represented generally by H. Said screening apparatus in this instance may comprise a containing vessel $n$, having a hollow shaft $o$ mounted horizontally therein. Carried on said shaft is a very fine cylindrical screen $p$, on the outer periphery of which are a plurality of stirring paddles or arms $q$. The hollow shaft $o$ is provided within the screen $p$ with one or more short suction pipes or openings $r$ therein. The shaft $o$ is rotated from a pulley $s$, so as to rotate the screen $p$ and the paddles or stirring-arms $r$. A suction-pipe $t$ communicates by a suitably-packed joint $u$ with the hollow shaft $o$ and extends downwardly to constitute a siphon, the lower end thereof leading preferably to a filter-press J. The suction-pipe $t$ is provided above and below, as shown, with valves $v$ and $w$, respectively. By closing the valve $w$ and opening the valve $v$ a supply of fresh water may be ejected through the hollow shaft $o$ to wash out the screen $p$ in the event of the same becoming clogged.

K represents any suitable form of drying device for desiccating the filter-cake obtained in the press J. If it is desired to convert the carbonate into a sulfate of lime or any other pure lime salt, a tank L may be used, to which the carbonate from the screening or mechanical separating device H may be conducted and subsequently treated with a suitable acid, such as sulfuric acid and others, to produce the desired lime salt.

In carrying out my improved process in an apparatus such as I have described I proceed substantially as follows: The solution of alkali carbonate in the tank A is passed into the filter-press B and is thereby clarified, the pure solution flowing into the tank C, in which it will be stored for use. The crude milk of caustic lime contained in the tank D is allowed to flow into the mechanical separator E, the stirring-arms $c$ keeping the liquid in agitation and the siphon $f$ drawing off the liquid and the finer particles of lime, which pass through the mesh of the screen $b$. The heavier impurities will be rejected by the screen and may be removed from the separator E in any suitable way. From the siphon $f$ the purified crude milk of lime passes into the reaction-tank F, and when a sufficient amount thereof has accumulated in said tank the valve $g$ is closed. The proper proportion of the clarified alkali-carbonate solution from the tank C is now allowed to enter the reaction-tank and the mixture is heated by the steam-coil $j$. I prefer that the mixture thus accumulated in the reaction-tank shall consist of from one hundred to one hundred and twenty parts of water, ten parts of carbonate of potash, and four to five parts of caustic lime, or of from eighty to one hundred parts of water, ten parts of carbonate of soda, and six to seven parts of caustic lime. It will be understood, however, that these proportions may be greatly varied without materially changing the results, and hence without departing from the essential spirit of my invention. The proportions given, however, result in a quick and fairly complete reaction under the increase of temperature. The reaction in the tank F results in the formation of a solution of caustic soda or caustic potash containing a small amount of caustic lime and an insoluble sediment of calcium carbonate containing some hydrated lime. The caustic-soda or caustic-potash solution is drawn off from the reaction-tank through the pipe $k$ and is used for any purpose desired. The insoluble sediment consists, as stated, of carbonate of lime, which will be in a comparatively pure state if the crude materials have been subjected to the purifying operations referred to. In some cases, therefore, and particularly when purification of the raw materials has been carefully carried out, the carbonate of lime from the reaction-tank F may be mixed with water and passed directly to the filter-press J and the filter-cake subsequently dried in the drier K, or instead thereof the milk of carbonate from the reaction-tank F may be passed directly to the tank L and be subsequently treated with a suitable acid, such as sulfuric acid and others, for obtaining the more or less soluble lime salt desired. Ordinarily, however, it is desirable to subject the carbonate of lime resulting from the reaction in the tank F to a further chemical or mechanical separating action, or both. Hence it is preferable to remove the carbonate of lime from the tank F into the tank G and to add thereto a sufficient quantity of water to form a relatively thin milk of carbonate of lime. Eventually carbonic acid or alkali carbonate, muriatic acid, or sulfuric acid, or other suitable acids are added. From this mixing-tank the mixture is allowed to flow through the mechanical separating device H. When the form of device illustrated is employed, the mixture enters the tank $n$ and is kept in constant agitation by the stirring arms or paddles $q$. By reason of the siphon $t$ the water carrying the fine particles of carbonate of lime will pass through the screen $p$, entering the opening or openings $r$ in the shaft $o$, and passing thence to the filter-press J. By reason of the screen $p$ the coarser impurities which may be still present will be rejected, and a very pure carbonate of lime in finely-divided amorphous form will thereby be produced as a filter-cake in the press J. This cake is then dried in the drier K, or it may be sold in its relatively moist form. If desired, the purified carbonate from the mechanical separator H may be passed to the tank L and be subjected to the treatment of a suitable acid, as explained. The pure carbonate of lime in amorphous finely-divided form which I obtain by the process above indicated may be used in place of precipitated chalk or as whiting, and for both of these uses it is commercially well adapted. At the same time it is obtained with the greatest economy of manufacture.

Having now described my invention, what I claim as new, and desire to secure by Letters Patent, is as follows:

1. In the manufacture of calcium carbonate from residues, the process of producing from calcium oxid and alkali carbonate a pure amorphous and extremely-divided calcium carbonate, which consists in removing the insoluble impurities from the calcium oxid and alkali carbonate, in causing these materials to react upon each other in the presence of water, and in then separating the calcium carbonate formed by the reaction from the alkali hydrate and practically from all soluble impurities, including calcium hydrate, substantially as described.

2. In the manufacture of calcium carbonate from residues, the process of producing from calcium oxid and alkali carbonate a pure amorphous and extremely-divided calcium carbonate, which consists in removing the insoluble impurities from the calcium oxid and alkali carbonate, in causing these materials to react upon each other in the presence of water, in then separating the calcium carbonate formed by the reaction from the alkali hydrate and practically from all soluble impurities, including calcium hydrate, and in subsequently drying said calcium carbonate, substantially as described.

3. In the manufacture of calcium carbonate from residues, the process of producing from calcium oxid and alkali carbonate a pure amorphous and extremely-divided calcium carbonate, which consists in subjecting the calcium oxid and alkali carbonate to the action of mechanical separators for removing the insoluble impurities therefrom, in causing these materials to react upon each other in the presence of water, and in then separating the calcium carbonate formed by the reaction from the alkali hydrate and practically from all soluble impurities, including calcium hydrate, substantially as described.

4. In the manufacture of calcium carbonate from residues, the process of producing from calcium oxid and alkali carbonate a pure amorphous and extremely-divided calcium carbonate, which consists in subjecting the calcium oxid and alkali carbonate to the action of mechanical separators for removing the insoluble impurities therefrom, in causing these materials to react upon each other in the presence of water, in then separating the calcium carbonate formed by the reaction from the alkali hydrate and practically from all soluble impurities, including calcium hydrate, and in subsequently drying said calcium carbonate, substantially as described.

5. In the manufacture of calcium carbonate from residues, the process of producing from calcium oxid and alkali carbonate a pure amorphous and extremely-divided calcium carbonate, which consists in filtering the alkali carbonate and in screening the calcium oxid for the removal of the soluble impurities from the calcium oxid and alkali carbonate, in causing these materials to react upon each other in the presence of water, in then separating the calcium carbonate formed by the reaction from the alkali hydrate and practically from all soluble impurities, including calcium hydrate, and in subsequently drying said calcium carbonate, substantially as described.

6. In the manufacture of calcium carbonate from residues, the process of producing from calcium oxid and alkali carbonate a pure amorphous and extremely-divided calcium carbonate, which consists in removing the insoluble impurities from the calcium oxid and alkali carbonate, in causing these materials to react upon each other in the presence of water, in then separating the calcium carbonate formed by the reaction from the alkali hydrate and practically from all soluble impurities, including calcium hydrate, and in subsequently subjecting the resulting calcium carbonate to the action of a mechanical separator, substantially as described.

7. In the manufacture of calcium carbonate from residues, the process of producing from calcium oxid and alkali carbonate a pure amorphous and extremely-divided calcium carbonate, which consists in removing the insoluble impurities from the calcium oxid and alkali carbonate, in causing these materials to react upon each other in the presence of water, in then separating the calcium carbonate formed by the reaction from the alkali hydrate and practically from all soluble impurities, including calcium hydrate, in subsequently subjecting the resulting calcium carbonate to the action of a mechanical separator, and in finally drying the same, substantially as described.

8. In the manufacture of calcium carbonate from residues, the process of producing from calcium oxid and alkali carbonate a pure amorphous and extremely-divided calcium carbonate, which consists in removing the insoluble impurities from the calcium oxid and alkali carbonate, in causing these materials to react upon each other in the presence of water, in then separating the calcium carbonate formed by the reaction from the alkali hydrate and practically from all soluble impurities, including calcium hydrate, in mixing the resulting calcium carbonate with water, and finally in passing said mixture through a mechanical separating apparatus, substantially as described.

9. In the manufacture of calcium carbonate from residues, the process of producing from calcium oxid and alkali carbonate a pure amorphous and extremely-divided calcium carbonate, which consists in removing the insoluble impurities from the calcium oxid and alkali carbonate, in causing these materials to react upon each other in the presence of water, in then separating the calcium carbonate formed by the reaction from the alkali hydrate and practically from all soluble impurities, including calcium hydrate, in mixing the resulting calcium carbonate with water, in passing said mixture through a mechanical separating apparatus, and finally in filtering the mixture, substantially as described.

10. In the manufacture of calcium carbonate from residues, the process of producing from calcium oxid and alkali carbonate a pure amorphous and extremely-divided calcium carbonate, which consists in removing the insoluble impurities from the calcium oxid and alkali carbonate, in causing these materials to react upon each other in the presence of water, in then separating the calcium carbonate formed by the reaction from the alkali hydrate and practically from all soluble impurities, including calcium hydrate, in mixing the resulting calcium carbonate with water, in passing said mixture through a mechanical separating apparatus, in filtering the mixture, and finally in drying the filter-cake, substantially as described.

This specification signed and witnessed this 7th day of December, 1897.

HERMAN E. STURCKE.

Witnesses:
EUGENE CONRAN,
FRANK L. DYER.